(12) United States Patent
Asakura et al.

(10) Patent No.: US 10,254,572 B2
(45) Date of Patent: Apr. 9, 2019

(54) INVERTING DEVICE AND METHOD FOR MANUFACTURING LIQUID CRYSTAL DISPLAY PANEL

(71) Applicant: Sakai Display Products Corporation, Osaka (JP)

(72) Inventors: Kenji Asakura, Osaka (JP); Makoto Tsuji, Osaka (JP); Kazuyuki Yamasaki, Osaka (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 0 days.

(21) Appl. No.: 15/661,797

(22) Filed: Jul. 27, 2017

(65) Prior Publication Data

US 2017/0322434 A1 Nov. 9, 2017

Related U.S. Application Data

(63) Continuation-in-part of application No. PCT/JP2015/052392, filed on Jan. 28, 2015.

(51) Int. Cl.
*G02F 1/13* (2006.01)
*G02F 1/1339* (2006.01)
(Continued)

(52) U.S. Cl.
CPC ............. *G02F 1/1303* (2013.01); *G02F 1/13* (2013.01); *G02F 1/1339* (2013.01);
(Continued)

(58) Field of Classification Search
None
See application file for complete search history.

(56) References Cited

U.S. PATENT DOCUMENTS

2003/0147037 A1   8/2003   Lee et al.
2003/0223030 A1   12/2003  Byun et al.
(Continued)

FOREIGN PATENT DOCUMENTS

JP   2003-233052 A   8/2003
JP   2006-227181 A   8/2006
(Continued)

OTHER PUBLICATIONS

English Translation of the International Search Report, PCT International Application No. PCT/JP2015/052392, Japan Patent Office, Tokyo, Japan. dated Apr. 7, 2015.

*Primary Examiner* — Ashok Patel
(74) *Attorney, Agent, or Firm* — Robert G. Crouch; Marsh Fischmann & Breyfogle LLP

(57) ABSTRACT

Provided are an inverting device capable of suppressing a defect caused by wear debris generated by contacting and sliding of clamping members on a substrate with a sealing member, the wear debris being melted when heating the substrate and then adhered thereto after cooling thereof, and a manufacturing method of a liquid crystal display panel using the inverting device. The inverting device includes a main body, an inverting portion, a substrate contact portion, and a substrate support portion. The substrate contact portion and the substrate support portion clamp the substrate, and the inverting portion inverts the substrate. The substrate contact portion and the substrate support portion each have heat-resistant layer with a heat resistance temperature which is equal to or higher than a temperature at which the sealing member is cured by heating.

13 Claims, 7 Drawing Sheets

(51) Int. Cl.
    *G02F 1/1341* (2006.01)
    *G09F 9/00* (2006.01)
    *G02F 1/1333* (2006.01)
(52) U.S. Cl.
    CPC .............. *G02F 1/1341* (2013.01); *G09F 9/00* (2013.01); *G02F 2001/133354* (2013.01)

(56) References Cited

U.S. PATENT DOCUMENTS

| | | | |
|---|---|---|---|
| 2005/0003737 A1* | 1/2005 | Montierth | A61B 8/546 |
| | | | 451/5 |
| 2005/0099584 A1 | 5/2005 | Lee et al. | |
| 2005/0099585 A1 | 5/2005 | Lee et al. | |
| 2005/0248715 A1 | 11/2005 | Byun et al. | |
| 2006/0245846 A1* | 11/2006 | Moura | H01L 21/681 |
| | | | 414/217 |
| 2008/0199284 A1 | 8/2008 | Mitsuyoshi et al. | |
| 2012/0039991 A1* | 2/2012 | Kaplitt | C07K 14/4747 |
| | | | 424/450 |
| 2013/0180551 A1 | 7/2013 | Mitsuyoshi et al. | |
| 2013/0206185 A1 | 8/2013 | Mitsuyoshi et al. | |

FOREIGN PATENT DOCUMENTS

| | | |
|---|---|---|
| JP | 2006-349913 A | 12/2006 |
| JP | 2007-213092 A | 8/2007 |
| JP | 2008-198882 A | 8/2008 |

\* cited by examiner

INVERTING DEVICE AND METHOD FOR MANUFACTURING LIQUID CRYSTAL DISPLAY PANEL

CROSS-REFERENCE TO RELATED APPLICATION

This is a continuation-in-part of PCT international application No. PCT/JP2015/052392 filed on Jan. 28, 2015, incorporated herein by reference.

BACKGROUND OF THE INVENTION

The present invention relates to an inverting device for inverting a pair of substrates by clamping the pair of substrate with a pair of clamping members, and to a method for manufacturing a liquid crystal display panel using the inverting device.

Within the field of display devices, liquid crystal display devices can have characteristics of thin profile and low power consumption.

The liquid crystal display device includes a liquid crystal display panel (hereinafter referred to as a display panel) and a backlight unit. In the case wherein the backlight unit is an edge light type, the backlight unit is configured such that it includes a light-guiding plate and the light emitted from a light source enters the light-guiding plate though a side surface and is radiated from a main surface, irradiating a back surface of the display panel.

The display panel includes a color filter substrate (hereinafter referred to as CF substrate) having a plurality of color filters, an active matrix substrate (hereinafter referred to as TFT substrate) having a plurality of thin film transistors (hereinafter referred to as TFT) as switching elements which is arranged to face the CF substrate and, a liquid crystal layer provided between the CF substrate and the TFT substrate, which are disposed to face each other with a predetermined gap maintained by a spacer, as a display medium layer.

With regard to the methods for manufacturing a display panel, reference can be made to, for example, JP 2006-349913 A. It describes firstly applying a sealing material to the inside of a circumferential part of each unit of a CF substrate, and then dropping a liquid crystal material inside the sealing material on the substrate in the form of a dot. The sealing material is ultraviolet curable and heat curable.

Then, the CF substrate and the TFT substrate are bonded together under vacuum atmosphere (hereinafter a pair of bonded substrates is referred to as a bonded substrate) with the CF substrate facing up. With regard to examples of an inverting device for a CF substrate, JP 2003-233052 A discloses a device configured such that after a liquid crystal material has been dropped on a TFT substrate and a sealing material has been applied to a CF substrate, the CF substrate is inverted so that the coated surface is in the bottom position, and then the CF substrate is bonded to the TFT substrate.

Next, the bonded substrate is inverted so that the TFT substrate is on the top, and the sealing material is pre-cured by irradiating ultraviolet light towards the TFT substrate of the bonded substrate. In the configuration in which a black matrix of a CF substrate and a sealing material are provided so as to overlap with each other for attaining a narrow frame, it is necessary to invert a bonded substrate so that the TFT substrate is on the top and the ultraviolet light can be irradiated through the TFT substrate.

After the irradiation of ultraviolet light, the bonded substrate is inverted so that the CF substrate is on the top, and the bonded substrate is heated at 130° C. for about 70 minutes for main curing of the sealing material. The bonded substrate is inverted because the bonded substrate should be transported with the CF substrate up in order to protect the CF substrate, which will be used for the front surface of the display panel, from being damaged.

Finally, the display panel is divided into units.

As described above, the bonded substrate is inverted using an inverting device. As inverting device, devices provided with a motor to invert a bonded substrate while clamping a bonded substrate by a plurality of pairs of clamping members can be used.

The clamping members are provided with a covering layer made of an inexpensive resin, such as polyolefin, on a surface of a core portion which is made of a metal.

The pairs of clamping members clamp a bonded substrate in the state where each of the covering layers of the clamping members contacts with the surfaces of the bonded substrate, and thus when the pair of clamping members is pressed to the bonded substrate and the bonded substrate is inverted, a substrate contacting surface of the clamping members tends to slightly slide in relation to the substrate surface, producing wear debris. The wear debris is made of, for example, polyethylene, polypropylene and the like. A melting point of polyethylene is 100 to 120° C. and a melting point of polypropylene is 120 to 130° C. Since those melting points are lower than the above-mentioned heat-curing temperature of 130° C., the wear debris will be melted on the surface of the display panel during heat-curing.

After cooling the bonded substrate, the melted wear debris is fixed to the surface of the display panel. The fixed wear debris cannot be completely removed by washing which is carried out when the bonded substrate is divided into the units or washing which is carried out after the circuit board mounting, and further, they are hardly recognized visually in, for example, a quality inspection process such as a visual inspection of the substrate before the polarizing plate is attached to. The wear debris can be visually recognized as a foreign substance only after the polarizing plates are attached to both outer surfaces of the bonded substrate, and a product will then be recognized faulty.

SUMMARY OF THE INVENTION

The present invention has been made in view of such circumstances as mentioned above, and an object of the present invention is to provide an inverting device wherein the melting of the wear debris, which is produced when a pair of clamping members contacts with and slides in relation to a pair of substrates to clamp the pair of substrates, when heating the pair of substrates, and the adhesion of the melted wear debris to the pair of substrates after cooling are prevented, thereby the occurrence of defective products can be reduced, and to provide a method for manufacturing a liquid crystal display panel using the inverting device.

The inverting device according to one embodiment of the present invention comprises a main body having a substrate contact portion and a substrate support portion inside thereof, the substrate contact portion and the substrate support portion being arranged in positions facing each other, and an inverting portion for inverting the main body so that a position of the substrate contact portion and a position of the substrate support portion are inverted, wherein the substrate contact portion and the substrate support portion each have a covering portion the covering portion of the substrate contact portion and the covering portion of the substrate support portion being provided in positions facing each other, and the covering portion of the substrate contact portion and the covering portion of the substrate support portion are formed of a material, a deformation temperature of the material being higher than a heat-curing temperature of a sealing member for a bonded substrate to be clamped between the covering portion of the substrate contact portion and the covering portion of the substrate support portion, a deformation being due to softening, melting or thermal decomposition of the material.

In this embodiment, a heat-resistance temperature of the covering portion, which is a temperature at which the covering portion are deformed by, for example, softening, is higher than a heat-curing temperature of the sealing member, thus, while the bonded substrate is being clamped between one or a plurality of the substrate contact portions and one or a plurality of the substrate support portions, even if the substrate contact portion and the substrate support portion slide in relation to the bonded substrate and wear debris is produced, the wear debris is not melted upon the heating of the bonded substrate for heat-curing of the sealing member, and thus after cooling of the bonded substrate, adhesion of the wear debris to the bonded substrate can be suppressed, reducing the occurrence of defective products.

In another embodiment of the present invention, a coefficient of static friction of the covering portion of the substrate contact portion and a coefficient of static friction of the covering portion of the substrate support portion with respect to the bonded substrate may be 0.3 or more.

In another embodiment of the present invention, a friction force can be generated without applying an excessive pressing force when the bonded substrate is clamped between the substrate contact portions and the substrate support portions, thereby sliding and shifting of the substrate contact portions and the substrate support portions along the bonded substrate can be suppressed.

In yet another embodiment of the present invention, a static friction force of the covering portion of the substrate contact portion and a static friction force of the covering portion of the substrate support portion to the bonded substrate while the bonded substrate is being clamped between the covering portion of the substrate contact portion and the covering portion of the substrate support portion may be larger than 9.81×(a mass of the bonded substrate [kg]) [N].

In the presently illustrated embodiment, the bonded substrate is prevented from dropping by a gravity during an inverting process.

In yet another embodiment of the inverting device according to the present invention, the covering portion may comprise a glass fiber or a carbon fiber.

In the presently illustrated embodiment, the inverting device may have an improved wear resistance and a long service life, thus providing a stable device operation over a prolonged period with low maintenance including reduced frequency of cleaning and replacement.

In yet another embodiment of the inverting device according to the present invention, the covering portion may comprise a material selected from the group consisting of polytetrafluoroethylene impregnated glass fiber, polyimide, nylon, aluminum and stainless steel.

In the presently illustrated embodiment, the covering portion may have a high static friction coefficient, thereby advantageously preventing the occurrence of position shifting when the bonded substrate is clamped.

In yet another embodiment of the inverting device according to the present invention, the covering portion may be antistatic-treated or have electrical conductivity.

In some embodiments, including the presently illustrated embodiment, the static electrification of the bonded substrate is prevented.

The exemplary device in yet another embodiment of the present invention may further comprise a slipping-down prevention portion configured to abut on an edge of the bonded substrate for preventing the bonded substrate from slipping down.

In the presently illustrated embodiment, this may prevent the bonded substrate from slipping down when being inverted.

In yet another embodiment of the inverting device according to the present invention, the substrate contact portion and the substrate support portion may comprise a plurality of core portions comprising a metal, and the covering portion is provided at an end of each of the plurality of core portions.

In the presently illustrated embodiment, the substrate contact portion and the substrate support portion may contact with the bonded substrate evenly over a large surface, thereby preventing the occurrence of localized, excessive pressing force and providing high clamping strength. The prevention of uneven distribution of the contact pressure between the bonded substrate and the substrate contact portion and substrate support portion as well as the prevention of occurrence of localized, excessive pressing force may ensure sufficient friction force due to a predetermined contact force while preventing a deformation of a spacer which defines a predetermined distance between each of the substrates of the bonded substrate. Moreover, the occurrence of thickness irregularity of the bonded substrate may be suppressed, and the slippage of the bonded substrate may be prevented.

In yet another embodiment of the inverting device according to the present invention, the covering portion may comprise a first covering portion provided on an end of the core portion and a second covering portion covering a surface of the first covering portion.

The first covering portion may comprise polyolefin or elastomer.

In the presently illustrated embodiment, uneven distribution of the contact pressure between the bonded substrate and the substrate contact portion and substrate support portion can be prevented and the occurrence of localized, excessive pressing force also can be prevented, thereby ensuring sufficient friction force due to a predetermined contact force while preventing a deformation of a spacer which defines a predetermined distance between each of the substrates of the bonded substrate. Therefore, the occurrence of thickness irregularity of the bonded substrate can be suppressed, and the slippage of the bonded substrate can be prevented. Further, the exemplary devices include the first covering portion covered with the second covering portion, thereby generation of an adhered substance derived from the first covering portion may be reduced when the first covering portion comprises polyolefin or elastomer.

A method for manufacturing a liquid crystal display panel according to one embodiment of the present invention may comprise; forming a bonded substrate by bonding a rectangular-shaped second substrate to a rectangular-shaped first substrate with facing a surface of the second substrate to a surface of the first substrate, wherein a frame-shape sealing member is provided on the surface of the first substrate, inverting the bonded substrate so that a position of the first substrate and a position of the second substrate are inverted, and heat-curing the sealing member of the bonded substrate, wherein the inverting is performed using the above-mentioned inverting devices.

In the presently illustrated embodiment, the melting of the wear debris which is produced between the bonded substrate and the substrate contact portion and substrate support portion and their adhesion to the substrate after cooling can be prevented. Accordingly, the generation of defective products can be reduced.

A method for manufacturing a liquid crystal display panel according to another embodiment of the present invention may comprise; forming a bonded substrate by bonding a rectangular-shaped second substrate to a rectangular-shaped first substrate with facing a surface of the second substrate to a surface of the first substrate, wherein a frame-shape sealing member is provided on the surface of the first substrate, inverting the bonded substrate so that a position of the first substrate and a position of the second substrate are inverted, irradiating the sealing member with ultraviolet light, and further inverting the bonded substrate, wherein the inverting and the further inverting are performed using the above-mentioned inverting devices.

In the presently illustrated embodiment, wherein the bonded substrate needs to be inverted in order to make one of the surfaces of the bonded substrate an ultraviolet irradiation surface, it is possible to suppress the melting of the wear debris from the clamping members, the substrate contact portions and substrate support portions in the subsequent heating process and their adhesion to the substrate after cooling.

In the exemplary inverting device according to one embodiment of the present invention may include the clamping members, each of them having heat-resistant layers opposed each other whose heat resistance temperature is equal to or higher than a predetermined temperature. This can make possible to prevent the wear debris, which can be produced when the clamping members clamp and slide against the substrate, from melting when the substrate is heated and from adhering to the substrate after cooling, resulting in reducing the generation of defective products.

In one embodiment of the method for manufacturing a liquid crystal display panel according to the present invention, generation of defective products due to the wear debris from the clamping member of the inverting device and the substrate can be suppressed.

DETAILED DESCRIPTION

The invention will be further described below in terms of several embodiments and particularly in terms of drawings showing some embodiments.

Embodiment 1

Figure 1:
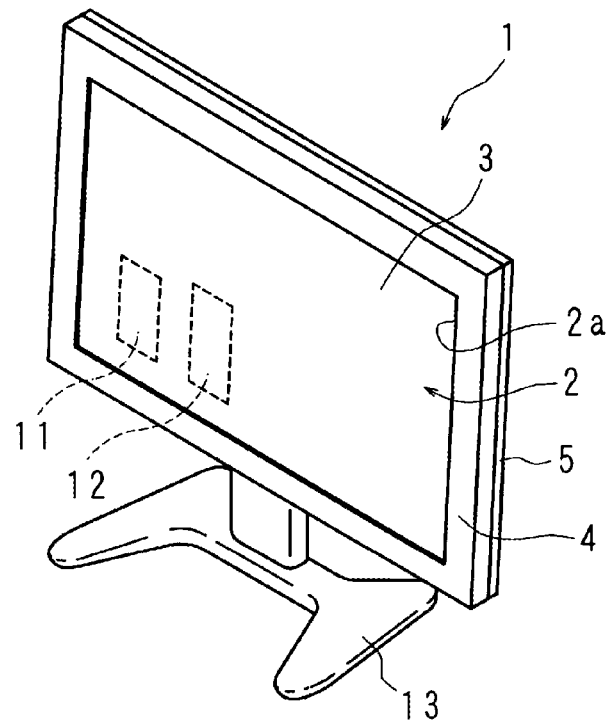
FIG. 1 shows a schematic perspective view of a television receiver according to Embodiment 1 of the present invention (hereinafter referred to as a TV receiver).
Figure 2:
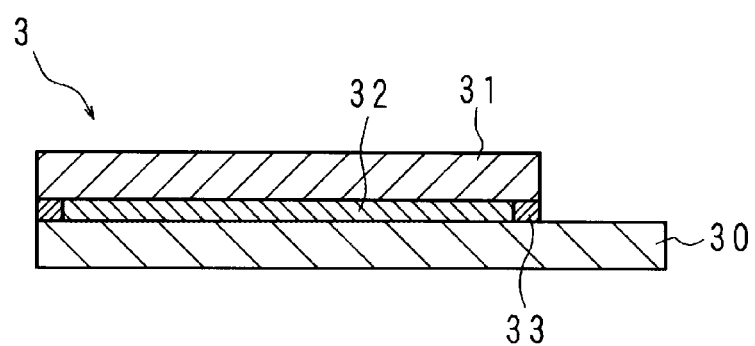
FIG. 2 shows a schematic cross-sectional view of a display panel according to Embodiment 1 of the present invention.

FIG. 1 shows a schematic perspective view of the TV receiver 1 according to Embodiment 1 of the present invention, and FIG. 2 show a schematic cross-sectional view of a display panel 3 according to Embodiment 1.

The TV receiver 1 includes a horizontally long display module 2 with which to display an image, a tuner 11 with which to receive a broadcast wave from an antenna (not shown), and a decoder 12 with which to decode an encoded broadcast wave. The TV receiver 1 may display an image on the display module 2 according to decoded information output by the decoder 12, which decodes the broadcast wave received by the tuner 11. A stand 13 with which to support the TV receiver 1 is provided at the bottom part of TV receiver 1.

When the display module 2 is, for example, of an edge light type, it may include a display panel 3, two, for example, of optical sheets (not shown), a light-guiding plate, a reflection sheet and a chassis.

The display module 2 is housed vertically between a front cabinet 4 and a rear cabinet 5, which are vertically disposed on the front and the rear of the display module 2, respectively. The front cabinet 4 may have a rectangular frame body covering the periphery of the display module 2, with a rectangular-shaped opening 2a in the center. The front cabinet 4 may be made of, for example, a plastic material. The rear cabinet 5 may have a rectangular tray-like shape with an opened front side, and include, for example, a plastic material. The front cabinet 4 and the rear cabinet 5, however, may be composed of other materials.

Vertical and horizontal dimensions of the front cabinet 4 and the rear cabinet 5 may be substantially the same, and their respective peripheral edges are opposed to each other. Vertical and horizontal dimensions of the display panel 3 may be slightly larger than those dimensions of the opening 2a of the front cabinet 4, the peripheral edges of the display panel 3 being opposed to inner edge parts of the front cabinet 4.

The display panel 3 includes an active matrix (TFT) substrate 30 and a color filter (CF) substrate 31, which are disposed facing each other, a liquid crystal layer 32 disposed between the TFT substrate 30 and the CF substrate 31 as a display medium layer, and a sealing member 33 provided in a frame shape with which to bond the TFT substrate 30 and the CF substrate 31 as well as to seal the liquid crystal layer 32 between the TFT substrate 30 and the CF substrate 31.

The TFT substrate 30 and the CF substrate 31 are bonded together, and then inverted twice as will be described below.

Figure 3:
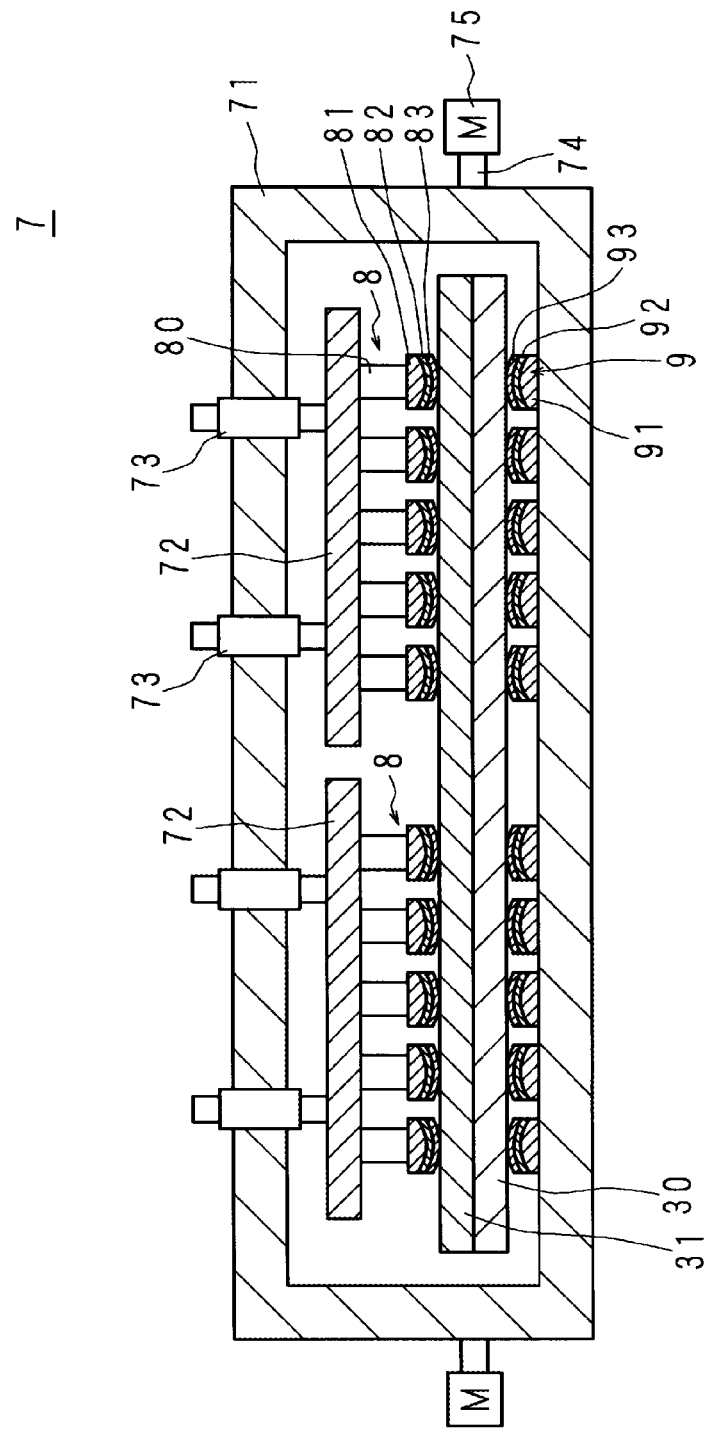
FIG. 3 shows a schematic cross-sectional view of an inverting device for inverting a bonded TFT substrate and CF substrate.
Figure 4:
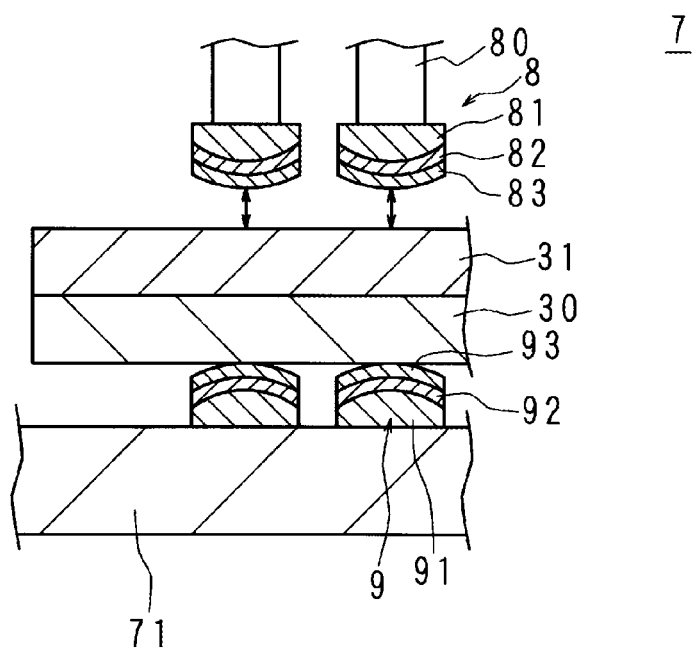
FIG. 4 is a partially enlarged cross-sectional view of FIG. 3.

FIG. 3 is an exemplary schematic cross-sectional view of an inverting device 7 for inverting the bonded TFT substrate 30 and CF substrate 31 (hereinafter referred to as a bonded substrate), and FIG. 4 is a partially enlarged cross-sectional view of FIG. 3. In FIG. 3, the sealing member 33 and the liquid crystal layer 32 are not shown. The inverting device 7 shown in FIG. 3 includes a main body 71, two of the shaft supporting portion 72, four of the air cylinder 73, two of the motor 75, a plurality of the substrate contact portions 8 and a plurality of the substrate support portions 9.

The main body 71 has a square tube-like structure with opened ends, and is positioned horizontally. On inside bottom surface of the main body 71 are provided ten of the horizontally placed, bar-shaped substrate support portions 9 extending in a depth direction when viewing FIG. 3 from above.

The substrate support portion 9 includes a rectangular-like shaped core portion 91 with an upper surface being upwardly curved as seen in a side view, a first covering portion 92 covering the upper surface of the core portion 91, and a second covering portion 93 covering the upper surface of the first covering portion 92.

Above the substrate support portions 9, at the positions corresponding to the respective substrate support portions 9 are provided ten of the horizontally placed, bar-shaped substrate contact portions 8 extending in a depth direction when viewing FIG. 3 from above.

The substrate contact portion 8 includes a vertically extending shaft part 80, and a rectangular-like shaped core portion 81 with a bottom surface being downwardly curved as seen in a side view which is provided at one end of the shaft part 80, a first covering portion 82 covering the bottom surface of the core portion 81, and a second covering portion 83 covering the bottom surface of the first covering portion 82.

The lengths of the substrate contact portions 8 and substrate support portions 9 are slightly longer than a depth of the main body 71.

Both the core portion 81 of the substrate contact portion 8 and the core portion 91 of the substrate support portion 9 may comprise aluminum.

Both the first covering portion 82 and the first covering portion 92 may include an affordable, low density polyolefin material.

The second covering portions 83 and 93 may comprise a heat-resistant material having a heat resistance temperature of 130° C. or higher. By the heat resistance temperature it is meant herein a temperature at which the deformation such as softening is observed. When it is hard to recognize the material is softened or not, it is meant a melting point, the temperature at which the second covering portion starts melting, or a temperature the second covering portion starts deforming, such as a thermal decomposition temperature. In other words, by the heat resistance temperature it is meant a temperature at which the softening, the melting, or the deforming by thermal decomposition is observed, particularly a temperature being 130° C. or higher, and needs to be higher than a heat-curing temperature of a sealing member 33, of which detailed description will be given below. The heat resistance temperature may be preferably 140° C. or higher.

With the heat resistance temperature of equal to or higher than 130° C., the adhesion to the CF substrate 31 or the TFT substrate 30 of the wear debris from the second covering portions 83 and 93 when the bonded substrate is clamped or inverted can be prevented during a curing process of a sealing member 33, of which detailed description will be given below.

Examples of the heat-resistant material for the second covering portions 83 and 93 having a heat resistance temperature of 130° C. or higher include, but not limited to, nylons such as nylon 6 and nylon 6,6, synthetic resins such as polyimide, fluorine-containing resin (including PTFE (polytetrafluoroethylene)), polyphenylene oxide (PPO), polysulfone, polypropylene, phenolic resin (phenolic novolac resin), fiber-reinforced plastic (FRP), and flexible metal thin plates and metal sheets of, for example, aluminum or SUS.

A static friction coefficient of the heat-resistant material when in contact with the glass material may be preferably 0.3 or more, more preferably 0.4 or more, further more preferably 1.0 or more, to obtain a predetermined friction force by applying a pressing force enough to obtain that force but not causing a cell thickness irregularities. With the coefficients of static friction within the range described above, the occurrence of sliding is suppressed while the bonded substrate being clamped and then inverted using the substrate support portions 9 and the substrate contact portions 8. The static friction coefficient may be preferably 1.8 or less, so that releasing properties of the substrate contact portion 8 and the substrate support portion 9 from the substrate can be satisfactory, with no contact marks by the substrate support portion 9 and substrate contact portion 8 left on the substrate.

A static friction force of the second covering portions 83, 93 is preferably larger than [9.81×(a mass of the bonded substrate [kg])] [N]. This prevents the bonded substrate from dropping by a gravity during an inverting process. Further, from the viewpoint of preventing the occurrence of the cell thickness irregularities, which corresponds to the irregularities in a predetermined distance between two substrates of the bonded substrate that are opposed each other, a pressing force of the pair of clamping members 8, 9 when in contact with the substrate may be preferably 100 N/cm$^2$ or less.

When the heat-resistant material includes synthetic resin, it may be preferable that the heat-resistant material includes a glass fiber or a carbon fiber. Such materials may possibly improve a wear resistance of the second covering portions 83, 93.

The heat-resistant material may preferably have electrical conductivity or be antistatic-treated material.

This can prevent a static electrification of the bonded substrate and a breakage of TFT element of the TFT substrate 30 due to an electric discharge, and further, an adhesion of foreign substances floating in the air caused by static electricity can be prevented.

When considering the above-described conditions, it may be preferable to select a heat-resistant material from the group of materials comprising PTFE-impregnated glass fiber, polyimide, nylon, and metal sheets such as aluminum and SUS. The above-mentioned fluorine-containing resins have a static friction coefficient of less than 0.3 despite of a high heat resistance temperature, and there may be a possibility to occur the sliding in relation to the bonded substrate when clamping.

Examples of the thicknesses of the substrate contact portion 8 and substrate support portion 9 include, but not limited to, the core portions 81, 91: 15 mm; the first covering portions 82, 92: 2 mm; and the second covering portions 83, 93: 0.2 mm.

The mass of the substrate may be 20 kg, and the total contact force of the substrate contact portion 8 and the substrate support portion 9, applied by the air cylinder 73, on the substrate may be 2000 N, and the maximum contact force taking into an account of a gravity and an impact force at the time of contact may be 6000 N. Further, an actual contact area, measured using a pressure sensitive paper, for ten of each of the substrate contact portions 8 and substrate support portions 9 may be 100 cm$^2$ per one surface.

This will lead a maximum contact pressure to the substrate of 60 N/cm$^2$. When the static friction coefficient is 0.3, the static friction force will be 600 N, and the force of gravity on the mass of the substrate will be 196.2 N.

Since the maximum contact pressure to the substrate is 60 N/cm$^2$, being smaller than 100 N/cm$^2$ with which a cell thickness irregularities may be caused, the occurrence of the cell thickness irregularities can be prevented. Further, since the maximum static friction force is 600 N, being larger than the substrate gravity of 196.2 N, sliding and dropping by gravity can be prevented. In order to prevent the substrate from sliding due to vibration or the like caused while driving the inverting device 7, the maximum static friction force is preferably three times or more of the substrate weight.

In the presently illustrated embodiment, the other end of the shaft part 80 connected to the substrate contact portion 8 is connected to the bottom surface of the shaft part support portion 72, and five of the shaft part 80 are supported by each shaft part support portions 72 while suspending from the shaft part support portion 72.

Two air cylinders 73 are provided respectively at an upper plate part of the main body 71, and lower end of the shaft portion of the air cylinder 73 is connected to the shaft part support portion 72. The air cylinder 73 elevates up and down the shaft part support portion 72, this configures the substrate contact portion 8 to be contacted with or separated from the TFT substrate 30 and the CF substrate 31 which are inserted between the substrate contact portion 8 and the substrate support portion 9.

The main body 71 is configured to be inverted by an inverting portion. In the presently illustrated embodiment, an inverting portion comprises the motor 75. The motors 75 may be respectively provided at both sides of the main body 71. The main body 71 is configured to be inverted by rotation of a shaft part 74 of the motors 75.

To invert the bonded TFT substrate 30 and CF substrate 31 using the inverting device 7, arranged as described, the substrate contact portions 8 are raised by the air cylinders 73 to provide a clearance between the substrate contact portions 8 and the substrate support portions 9, and then the bonded substrate is inserted into the clearance and placed on the substrate support portions 9. The substrate contact portions 8 are then moved downward by the air cylinders 73 so that the bonded substrate is held between the substrate contact portions 8 and the substrate support portions 9.

Then the upper and lower parts of the main body 71 are inverted by rotating the shaft part 74 of the motors 75 so that the bonded substrate is inverted.

Figure 5A:
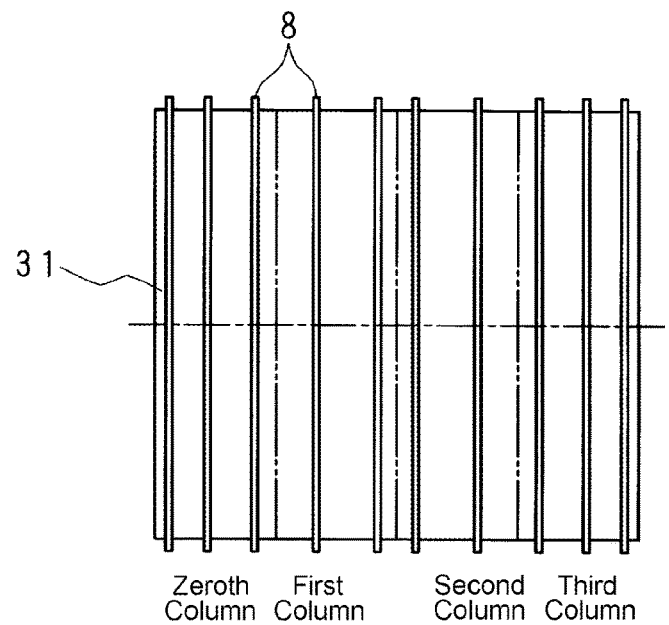
FIG. 5A shows a schematic plan view of a bonded substrate before being inverted and substrate contact portions.
Figure 5B:
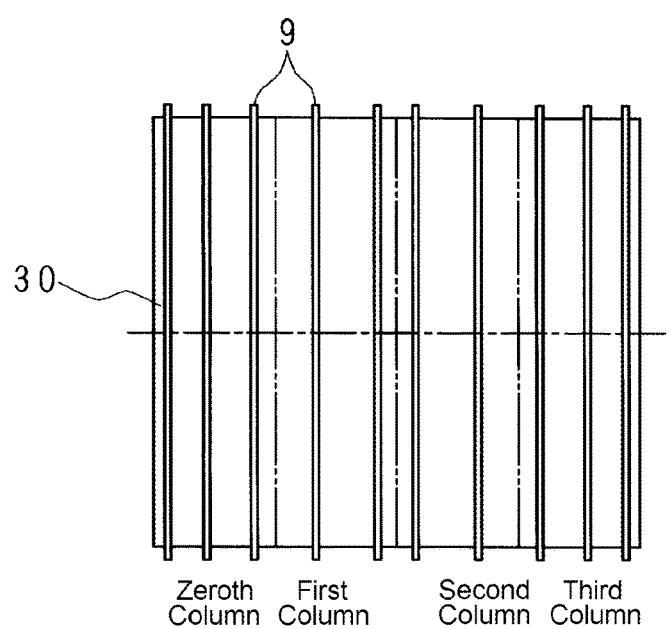
FIG. 5B shows a schematic plan view of a bonded substrate after being inverted and substrate support portions.

FIG. 5A shows a schematic plan view of the bonded substrate before being inverted and the substrate contact portions 8, and FIG. 5B shows a schematic plan view of the bonded substrate after being inverted and the substrate support portions 9. FIG. 5A and FIG. 5B show a particular embodiment of a first inverting, which will be described below. In the figures, a rotation axis is indicated by the alternate long and short dashed lines shows, and the boundaries of the respective columns are indicated by alternate long and two short dashed lines.

As shown in FIG. 5A and FIG. 5B, the CF substrate 31 and the substrate contact portions 8 are positioned in the upper part of the main body 71, and then by the inversion, the TFT substrate 30 and the substrate support portions 9 are positioned in the upper part of the main body 71.

The method for manufacturing the display panel 3 will be described below.

Figure 6:
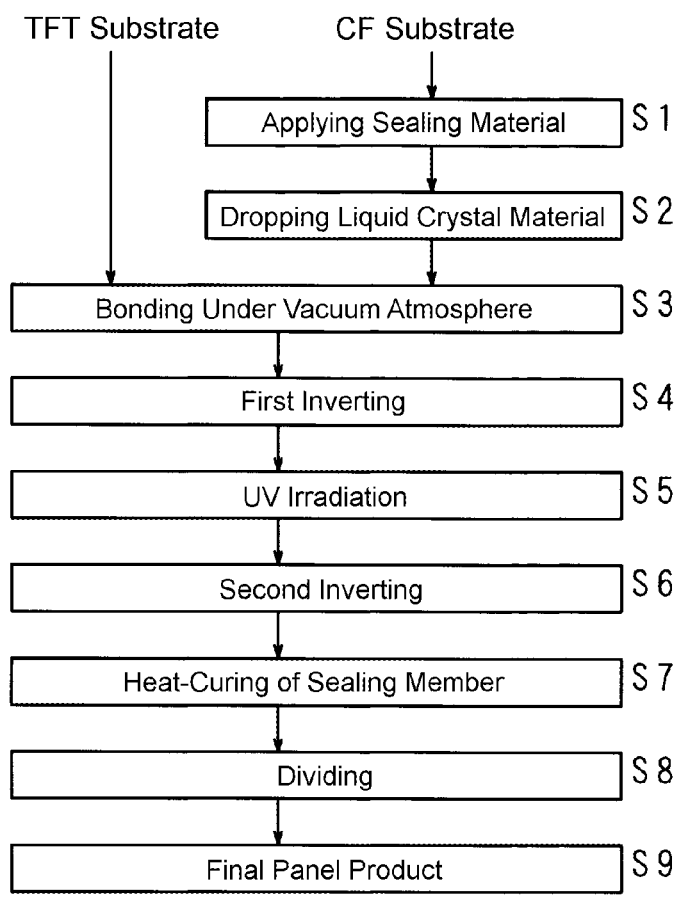
FIG. 6 is a flowchart illustrating a method of manufacturing a display panel.

FIG. 6 is a flow chart showing a method for manufacturing the display panel 3.

First, the sealing material is applied in a frame shape along the peripheral end parts of each unit of the CF substrate 31 by screen printing or the like to form a sealing member 33 (S1). The sealing materials may include a synthetic resin having ultraviolet curability and thermosetting curability.

Next, a liquid crystal material is applied dropwise inside the sealing member 33 on the CF substrate 31 in a dot-like pattern, with a predetermined interval (S2).

The CF substrate 31 and the TFT substrate 30 are housed in a processing chamber from which the atmosphere inside is evacuated up to the desired degree of vacuum, for example, 1 Pa and the like.

Then, the CF substrate 31 on which the liquid crystal material 32 has been dropped and the TFT substrate 30 are bonded under vacuum atmosphere (S3). At this time, the CF substrate 31 is on the top.

By releasing the vacuum in the processing chamber the pressure difference is established between the inside and the outside of a pair of the substrates of the bonded substrate, and the CF substrate 31 and the TFT substrate 30 are pressed each other from outside of the bonded substrate under uniform pressure. This will lead the applied liquid crystal material 32 to be diffused while contacting each other. There is a clearance between the sealing member 33 and the peripheral end of the liquid crystal material 32, and a region where the liquid crystal material 32 is not spread is an air bubble region.

To allow the irradiation of ultraviolet light towards the TFT substrate 30 after the substrate bonding, the bonded substrate taken out from the processing chamber will be inverted using the above-mentioned inverting device 7 so that the CF substrate 31 which is on the top will be on the bottom, and the TFT substrate 30 which is on the bottom will be on the top (a first inverting step: S4).

Then, ultraviolet light is irradiated to the sealing member 33 to be pre-cured (S5).

Again, using the inverting device 7, the bonded substrate is inverted so that the TFT substrate 30 which is on the top will be on the bottom, and the CF substrate 31 which is on the bottom will be on the top (a second inverting step: S6).

Next, the display panel 3 is housed in a heating chamber, then heated at 130° C. for about 70 minutes to cure the sealing member 33 (S7).

A rapid increase of temperature up to 130° C. causes thermal expansion of the liquid crystal material 32, resulting in the diffusion of the liquid crystal material 32 between the pair of CF substrate and the TFT substrate.

Finally, the display panel 3 is divided into units (S8).

The display panel 3 is manufactured in a manner as described above (S9).

The inverting device 7 of this embodiment is so configured as described above, preventing a generation of wear debris due to the sliding when pressing the bonded substrate to clamp or when inverting the bonded substrate. Even if the wear debris is produced, since the heat resistance temperature of the second covering portions 83, 93 of the substrate contact portions 8 and the substrate support portions 9 is higher than the heat-curing temperature of the sealing member 33, the melting of wear debris during the heat-curing of the sealing member 33 and the adhesion of the melting wear debris to the bonded substrate can be prevented. Accordingly, the occurrence of defective products can be reduced.

In the case where, for example, a glass fiber impregnated with PTFE is used for the second covering portions 83, 93, the eight substrate support portions 9 except for both ends of the ten substrate support portions 9 may be formed of three layers including a core portion 91, a first covering portion 92 and a second covering portion 93, while the both ends of the ten substrate support portions 9 are disposed near both ends of the bottom plate, and may be formed of two layers wherein the surface of a core portion 91 is covered with only a first covering portion 92.

Similarly, the eight substrate contact portions 8 except for both ends of the ten substrate contact portions 8 may be formed of three layers including a core portion 81, a first covering portion 82 and a second covering portion 83, while both ends of the ten substrate contact portions 8 are disposed near both ends of the bottom plate, and may be formed of two layers wherein the surface of a core portion 81 is covered with only a first covering portion 82. Since the coefficients of static friction of the first covering portions 82, 92 are large, slipping of the bonded substrate can be satisfactorily suppressed near the both ends.

In the case where, for example, materials such as polyimide that have a higher coefficient of static friction than does the PTFE-impregnated glass fiber are used as the second covering portions 83, 93, the substrate contact portions 8 and the substrate support portions 9 corresponding to the both ends of ten of each of substrate contact portions 8 and substrate support portions 9 are not necessarily be formed of two layers. Also, the polyimide has a thermal decomposition temperature of about 400° C. and thus can provide superior heat resistance. Further, when conductive polyimide is used, a static electrification of the bonded substrate caused by the contacting can also be prevented.

Embodiment 2

The inverting device 7 according to Embodiment 2 of the present invention has a configuration similar to that of the inverting device 7 according to Embodiment 1 except that the configuration of the substrate contact portion 8 and the substrate support portion 9 is different.

Figure 7:
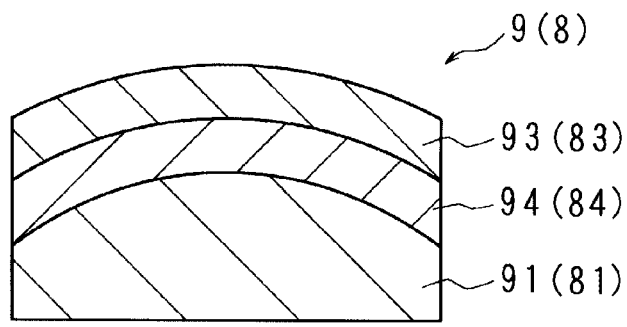
FIG. 7 shows a schematic cross-sectional view of a substrate support portion and substrate contact portion according to Embodiment 2 of the present invention.

FIG. 7 shows a schematic cross-sectional view of the substrate contact portion 8 and the substrate support portion 9 according to Embodiment 2 of the present invention.

The substrate support portion 9 includes a rectangular-like shaped core portion 91 with an upper surface being upwardly curved as seen in a side view, a first covering portion 94 covering the upper surface of the core portion 91, and a second covering portion 93 covering the upper surface of the first covering portion 94.

The substrate contact portion 8 also has the similar configuration to the substrate support portion 9, however, the upper and lower parts as seen in a side view are inverted in relative to the substrate support portion 9, including a rectangular-like shaped core portion 81 with a bottom surface being downwardly curved as seen in a side view, a first covering portion 84 covering the lower surface of the core portion 81, and a second covering portion 83 covering the lower surface of the first covering portion 84.

Both the core portion 81 of the substrate contact portion 8 and the core portion 91 of the substrate support portion 9 may comprise aluminum.

Both of the first covering portion 84 of the substrate contact portion 8 and the first covering portion 94 of the substrate support portion 9 may comprise rubber such as fluorine-containing rubber such as a Teflon (registered trademark) rubber or silicone rubber.

The second covering portion 83 of the substrate contact portion 8 and the second covering portion 93 of the substrate support portion 9 may comprise a heat-resistant material having a heat resistance temperature equal to or higher than 130° C. The heat resistance temperature may be preferably 140° C. or higher. With the heat resistance temperature of equal to or higher than 130° C. or higher, the adhesion to the CF substrate 31 or the TFT substrate 30 can be prevented during a heat-curing process of the sealing member 33.

Examples of the heat-resistant material for the second covering portions 83, 93 having a heat resistance temperature equal to or higher than 130° C. include, but not limited to, nylon 6,6, synthetic resins such as polyimide, and thin plates of metal such as aluminum or SUS.

A coefficient of static friction of the heat-resistant material when in contact with the glass material may be preferably 0.3 or more, more preferably 0.4 or more, further more preferably 1.0 or more.

A static friction force of the heat-resistant material is preferably larger than [9.81×(a mass of the bonded substrate [kg])] [N].

The heat-resistant material may preferably include a glass fiber or a carbon fiber.

The heat-resistant material may preferably have electrical conductivity or be antistatic-treated material. The antistatic treatment can be carried out, for example, by mixing electrically conductive particles to the second covering portions 83, 93 or by using antistatic PTFE for the second covering portions 83, 93.

When considering the above-mentioned conditions, it may be preferable to select a heat-resistant material from the group of materials comprising a glass fiber impregnated with PTFE, polyimide, nylon, and a thin plate of a metal such as aluminum or SUS.

Examples of the thickness of the substrate contact portion 8 and the substrate support portion 9 include, but not limited to, the core portions 81, 91: 20 mm; the first covering portions 84, 94: 2 mm; and the second covering portions 83, 93: 0.2 mm.

The mass of substrate may be 20 kg, and the total contact force of the substrate contact portion 8 and the substrate support part 9, applied by the air cylinder 73, on the substrate may be 2000 N, and the maximum contact force taking into an account of a gravity and an impact force at the time of contact may be 5000 N. Further, an actual contact area, measured using a pressure sensitive paper, for ten of each of the substrate contact portions 8 and the substrate support portions 9 may be 300 cm$^2$ per one surface.

This will lead a maximum contact pressure to the substrate of 17 N/cm$^2$. When the static friction coefficient is 0.3, the static friction force will be 600 N, and the force of gravity on the mass of the substrate will be 196.2 N.

Since the maximum contact pressure to the substrate is 17 N/cm$^2$, being slightly smaller than 100 N/cm$^2$ with which the cell irregularities may be caused, the occurrence of the cell thickness irregularities can be prevented. Further, since the maximum static friction force is 600 N, being larger than the substrate gravity of 196.2 N, sliding and dropping by gravity can be prevented. In order to prevent the substrate from sliding due to vibration or the like caused while driving the inverting device 7, the maximum static friction force is preferably three times or more of the substrate weight.

In the presently illustrated embodiment, since the first covering portions 84, 94 include a rubber material, the occurrence of the cell thickness irregularities, which may be caused by uneven distribution of the contact pressure to the substrate when the surfaces of the substrate contact portion 8 and the substrate support part 9 to be contacted with the substrate includes hard material, can be prevented, and a friction force can be provided uniformly onto the substrate. Therefore, slipping of the substrate contact portion 8 and the substrate support portion 9 can be prevented. Further, there will be no deterioration of the quality of the display panel caused by surface irregularities resulting from the adhesion of the low-molecular-weight component of the rubber material to the substrate which occurs when the rubber layer is the outermost layer. A local impact force during the contact can be suppressed because of the elasticity on surface, and the impact force when the bonded substrate is loaded on the substrate support portion 9 positioned at the lower part of the main body 71 before the bonded substrate is clamped can also be suppressed. This allows the substrate motion speed to be set high at the time of loading the substrates, resulting in the shortened tact time for the substrate transfer.

It may be preferable to use a metal thin plate such as aluminum or SUS for the second covering portions 83, 93, since the heat resistance temperature and the coefficient of static friction are high, a high durability can be assured.

Embodiment 3

The inverting device 7 according to Embodiment 3 of the present invention has a configuration similar to that of the inverting device 7 according to the Embodiment 1 except that the inverting device 7 according to Embodiment 3 is provided with slipping-down prevention portions 76 configured to abut on the edges of the substrate contact portion 8 and the substrate support portion 9 and prevent the bonded substrate from slipping down.

Figure 8:
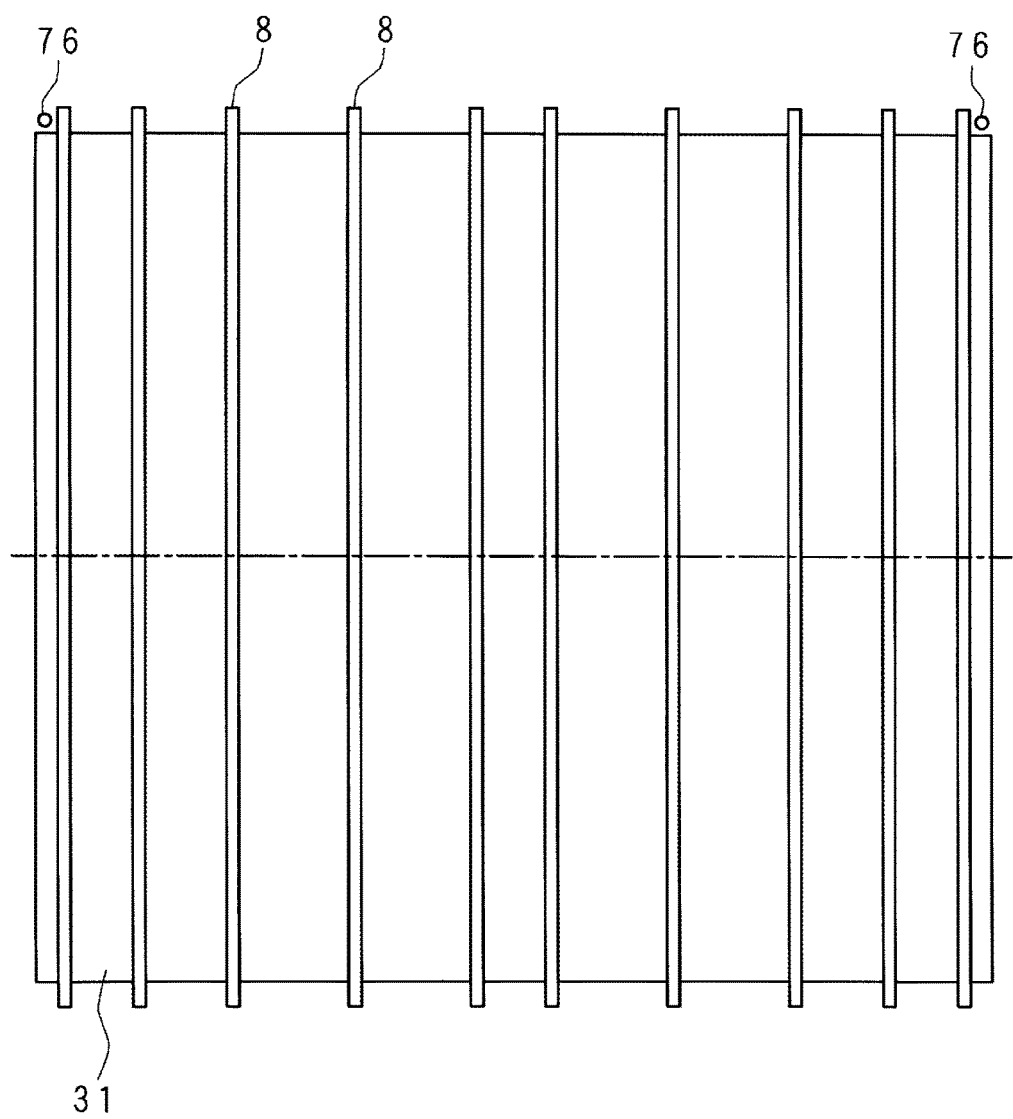
FIG. 8 shows a schematic plan view of a bonded substrate before being inverted and substrate contact portions.
Figure 9A:
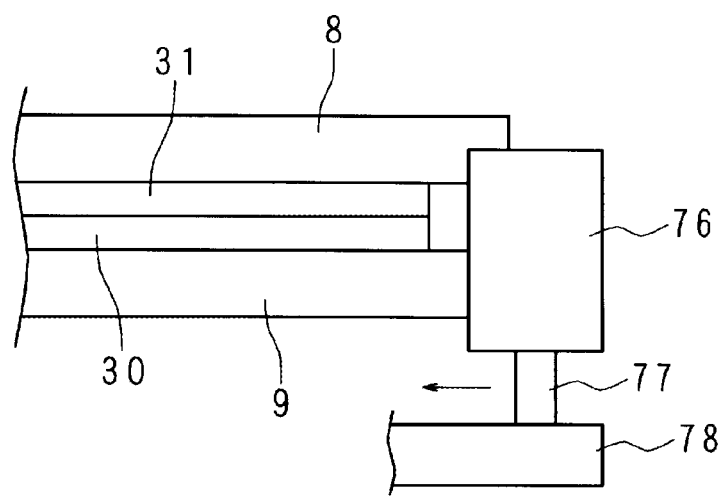
FIG. 9A shows a schematic side view of the state before a slipping-down prevention portion contacts with an edge of the bonded substrate.
Figure 9B:
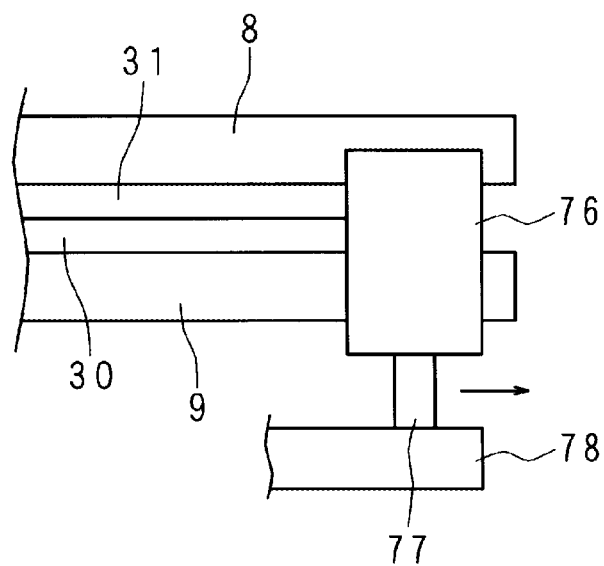
FIG. 9B shows a schematic side view of the state in which a slipping-down prevention portion abuts on an edge of the bonded substrate.

FIG. 8 shows a schematic plan view of a bonded substrate before being inverted and substrate contact portions 8, FIG. 9A shows a schematic side view of the state before a slipping-down prevention portion 76 contacts with an edge of the bonded substrate, and FIG. 9B shows a schematic side view of the state in which a slipping-down prevention portion 76 abuts on an edge of the bonded substrate. FIG. 9A and FIG. 9B are side views of the right upper part of FIG. 8 when viewed from the right side.

The CF substrate 31 and the TFT substrate 30 (the bonded substrate) are clamped between the substrate contact portions 8 and the substrate support portions 9, and the slipping-down prevention portions 76 are provided at both ends of the edge of the bonded substrate, which is shown in FIG. 8 as an upper long side of the bonded substrate (will be a lower long side when inverted), adjacent to the substrate contact portions 8 positioned at both ends.

The slipping-down prevention portions 76 may be cylindrical members comprising a resin having a heat resistance, such as nylon or a PEEK material, and arranged to be fixed to a support shaft 77 comprising stainless steel, and the support shaft 77 may be arranged to be supported by a shaft part 78 of an air cylinder (not shown) provided on the main body 71. The slipping-down prevention portions 76 can contact with or be spaced apart from the edge of the bonded substrate by means of the air cylinder. That is, the slipping-down prevention portions 76 can move forward and backward in a direction perpendicular to the edge. The bonded substrate may be placed between the substrate contact portion 8 and the substrate support portion 9 while the slipping-down prevention portions 76 being separated from the edge of the bonded substrate. Then, the substrate contact portions 8 are moved to contact with the bonded substrate, and the bonded substrate is clamped. The air cylinders makes the slipping-down prevention portion 76 move to where the slipping-down prevention portion comes into contact with the edge of the bonded substrate clamped between the substrate contact portions 8 and the substrate support portions 9. The slipping-down prevention portion 76 is then fixed at this position to keep the contact with the edge of the bonded substrate, preventing the bonded substrate from slipping down while the upper and lower parts of the main body 71 are inverted by rotation of a shaft part 74 of the motors 75 to invert the bonded substrate. After driving the inverting device 7 and the inversion of the bonded substrate, the slipping-down prevention portion 76 can be moved away from the edge of the substrate by means of the air cylinder. After the slipping-down prevention portions 76 are moved away, the bonded substrate will be taken out from the inverting device 7.

In the presently illustrated Embodiment, the slipping-down prevention portion 76 is provided at an end of the substrate contact portion 8 and the substrate support portion 9, preventing the bonded substrate from slipping down when the bonded substrate is inverted by rotating the shaft part 74.

The number of slipping-down prevention portions 76 to be provided is not particularly limited to two and three or more of them may be provided.

In each of the embodiments described above, the substrates are bonded when the CF substrate 31 is on the top and the TFT substrate 30 is on the bottom and the substrate is inverted using the inverting device 7 after bonding but before the UV irradiation, and after the UV irradiation. However, it can be also achieved by similar configurations wherein, for example, the substrates are bonded when the CF substrate 31 is on the bottom and the TFT substrate 30 is on the top and the inverting device 7 is used only once after bonding and UV irradiation.

Example

Next the present Embodiment is further described in more detail by referring to the following Examples, but it will be understood that there is no intent to limit the invention by such Examples.

Example

The inverting device 7 was configured such that eight of each of substrate contact portions 8 and substrate support portions 9 except for both ends of ten of each of substrate contact portions 8 and substrate support portions 9 include core portions 81, 91 comprising aluminum, first covering portions 82, 92 comprising thermoplastic low-density polyolefin, and second covering portions 83, 93 comprising a PTFE-impregnated glass fiber material ("TG cloth (antistatic adhesive type)" available from Yodogawa Hu-Tech Co., Ltd.). Two of each of the substrate contact portions 8 and substrate support portions 9 corresponding to the both ends of ten of each of substrate contact portions 8 and substrate support portions 9 did not include the second covering portions 83, 93, and the core portions 81, 91 were covered with only the first covering portions 82, 92. The thickness of the core portions 81, 91 was 15 mm, the thickness of the first covering portions 82, 92 was 2 mm, and the thickness of the second covering portions 83, 93 was 0.2 mm.

Comparative Example

The core portions 81, 91 of ten of each of substrate contact portions 8 and substrate support portions 9 of the inverting device were covered with only the first covering portions 82, 92. The thickness of the core portions 81, 91 was 15 mm, and the thickness of the first covering portions 82, 92 was 2 mm.

The following Table 1 shows heat resistance temperatures, coefficients of static friction, presence/absence of sticking of the substrate, presence/absence of traces on the substrate, presence/absence of sliding of the substrate, and durability of the outermost layer (second covering portions 83, 93) of Examples and the outermost layer (first covering portion 82, 92) of Comparative Example.

TABLE 1

|  | Ex. | Com. Ex. |
| --- | --- | --- |
| Heat resistance temperature | 200° C. | 80° C. |
| Coefficient of static friction | 0.35 | 1.0 |
| Sticking of substrate | Nil | Nil |
| Traces left on the substrate | Nil | Nil |
| Slipping of substrate | Nil | Nil |
| Durability | good | not good |

The coefficient of static friction indicated is a static friction coefficient on glass.

The sticking of the substrate was studied to examine whether the substrate was adhered to the substrate contact portion 8 or the substrate support portion 9 when clamping force was released (whether or not releasability is good). No sticking of the substrate was observed in either Example or Comparative Example.

The presence/absence of traces left on the substrate was studied to examine whether or not traces of the substrate contact portion 8 or the substrate support portion 9 were transferred to the substrate, using a search light in a dark place. No traces of the substrate contact portion 8 or the substrate support portion 9, studied by light transmission and reflection, were observed in either Example or Comparative Example, and further, no luminance unevenness caused by such traces was observed when the polarizing plate was attached to the substrate and lighting state was examined.

The "TG cloth", which is described above and is the material for the second covering portions 83, 93, was rubbed each other 200 times and then kneaded to give a damage, but it did not cause any peeling on the surface and no rip was observed, indicating high durability of the material.

In both Example and Comparative Example, it was found that no slipping was observed at the four corners of the bonded substrate, even when the inverting operation was performed 20 times.

[Determination of Presence or Absence of Foreign Substances]

After polarizing plates were attached to the outer surface of the TFT substrate 30 and the outer surface of the CF substrate 31, presence or absence of foreign substances (adhered substances derived from the material of the outermost layer of the substrate contact portion 8 and substrate support portion 9) was determined, and the results are shown in Table 2 below.

TABLE 2

| | | | The Number of Examinations | Zeroth Column Cell | First Column Cell | Second Column Cell | Third Column Cell | Total |
| --- | --- | --- | --- | --- | --- | --- | --- | --- |
| CF Side | Ex. | 1 | 2247 | 0.00% | 0.00% | 0.00% | 0.00% | 0.00% |
| | | 2 | 2977 | 0.00% | 0.00% | 0.00% | 0.00% | 0.00% |
| | | 3 | 1994 | 0.00% | 0.00% | 0.00% | 0.00% | 0.00% |
| | | 4 | 1763 | 0.00% | 0.00% | 0.00% | 0.00% | 0.00% |
| | | 5 | 866 | 0.00% | 0.00% | 0.00% | 0.00% | 0.00% |
| | | 6 | 1667 | 0.00% | 0.00% | 0.00% | 0.00% | 0.00% |
| | Com. Ex. | 1 | 2706 | 0.00% | 0.00% | 0.04% | 0.00% | 0.04% |
| | | 2 | 4458 | 0.00% | 0.00% | 0.00% | 0.00% | 0.00% |
| | | 3 | 3598 | 0.00% | 0.00% | 0.00% | 0.00% | 0.00% |
| | | 4 | 3214 | 0.00% | 0.00% | 0.00% | 0.00% | 0.00% |
| | | 5 | 1683 | 0.00% | 0.00% | 0.00% | 0.00% | 0.00% |
| TFT Side | Ex. | 1 | 2247 | 0.00% | 0.00% | 0.00% | 0.00% | 0.00% |
| | | 2 | 2977 | 0.00% | 0.00% | 0.00% | 0.00% | 0.00% |
| | | 3 | 1994 | 0.00% | 0.00% | 0.00% | 0.05% | 0.05% |
| | | 4 | 1763 | 0.06% | 0.00% | 0.00% | 0.06% | 0.11% |
| | | 5 | 866 | 0.00% | 0.00% | 0.00% | 0.00% | 0.00% |
| | | 6 | 1667 | 0.06% | 0.00% | 0.00% | 0.00% | 0.06% |
| | Com. Ex. | 1 | 2706 | 0.04% | 0.04% | 0.11% | 0.11% | 0.30% |
| | | 2 | 4458 | 0.07% | 0.04% | 0.09% | 0.04% | 0.25% |
| | | 3 | 3598 | 0.06% | 0.03% | 0.03% | 0.14% | 0.25% |
| | | 4 | 3214 | 0.06% | 0.06% | 0.03% | 0.06% | 0.22% |
| | | 5 | 1683 | 0.00% | 0.12% | 0.00% | 0.00% | 0.12% |

The numbers of Examples and Comparative Examples in Table 2 indicate batch groups (a first batch group, a second batch group, - - - ) of display panels 3 produced with a polarizing plate attached to the outer surface of the TFT substrate 30 and the outer surface of the CF substrate 31.

In Table 2, the zeroth column cell, the first column cell, the second column cell and the third column cell indicate a column of the cells for segmenting the each unit of display panel 3 from a mother glass (see FIG. 5A and FIG. 5B).

Table 2 shows that generation of a foreign substance was suppressed by implementing the manufacturing method described in Example, and especially, when the substrate contact portions 8 and the substrate support portions 9 having inside three-layer structure contact with the substrate, shown in the first column cell and the second column cell, no foreign substance was observed at all. When one of each of the substrate contact portions 8 and the substrate support portions 9 among three of each of substrate contact portions 8 and substrate support portions 9 have two-layer structure without second covering portion 83, 93, shown in the zeroth column cell and the third column cell, foreign substances were observed. However, the two other have the configuration of Example and can provide an effect of Example, resulting in a reduced incident of the foreign substances when compared with Comparative Example.

From these results, it was found that the incident of the foreign substances was reduced on the surface of the substrate, allowing the occurrence of defective products to be reduced, by implementing the method for manufacturing a display panel described in Example.

It should be appreciated that the disclosed Embodiments 1 to 3 are intended to be illustrative and not restrictive in all respects. The scope of the present invention is not limited to the above-described context, and the meaning equivalent to the claims and all modifications within the scope of the claims are intended to be included.

For example, the numbers of substrate contact portions 8, substrate support portions 9, air cylinders 73 are not limited to the numbers described in exemplary Embodiments 1 to 3. The shape of the core portions 81, 91 is also not limited to the shape described in exemplary Embodiments 1 to 3, and may be a quadrangular or pentagonal shape.

Moreover, the substrate contact portions 8 and the substrate support portions 9 are not limited to a three-layer structure, and the surface of the core portion may be covered with one covering portion. For the covering portion, it may be preferable to use a material having heat resistance, a coefficient of static friction, and a static friction force that satisfy the above-mentioned conditions, as well as good releasability, leaving no traces on the bonded substrate.

When the display panel 3 is manufactured, a liquid crystal material may be injected between the CF substrate 31 and the TFT substrate 30 after bonding the substrates together.

Further, the inverting device 7 is not limited for a use of manufacturing the display panel 3.

What is claimed is:

1. An inverting device comprising:
a main body having a substrate contact portion and a substrate support portion inside thereof and collectively configured to clamp a bonded substrate, the substrate contact portion and the substrate support portion being arranged in positions facing each other, and
an inverting portion for inverting the main body so that a position of the substrate contact portion and a position of the substrate support portion are inverted,
wherein the substrate contact portion and the substrate support portion each have a covering portion, the covering portion of the substrate contact portion and the covering portion of the substrate support portion being provided in positions facing each other, and
at least a surface of the covering portion of the substrate contact portion and at least a surface of the covering portion of the substrate support portion are formed of a material, a deformation temperature of the material being 130° C. or higher, a deformation being due to softening, melting or thermal decomposition of the material.

2. The inverting device of claim 1, wherein a coefficient of static friction of at least the surface of the covering portion of the substrate contact portion and a coefficient of static friction of at least the surface of the covering portion of the substrate support portion with respect to the bonded substrate are 0.3 or more.

3. The inverting device of claim 1, wherein a static friction force of the covering portion of the substrate contact portion and a static friction force of the covering portion of the substrate support portion to the bonded substrate while the bonded substrate is being clamped between the covering portion of the substrate contact portion and the covering portion of the substrate support portion are larger than 9.81×(a mass of the bonded substrate [kg]) [N].

4. The inverting device of claim 1, wherein at least the surface of the covering portion comprises a glass fiber or a carbon fiber.

5. The inverting device of claim 1, wherein at least the surface of the covering portion comprises a material selected from the group consisting of polytetrafluoroethylene impregnated glass fiber, polyimide, nylon, aluminum and stainless steel.

6. The inverting device of claim 1, wherein at least the surface of the covering portion is antistatic-treated or has electrical conductivity.

7. The inverting device of claim 1, further comprising a slipping-down prevention portion configured to abut on an edge of the bonded substrate for preventing the bonded substrate from slipping down.

8. The inverting device of claim 1, wherein the substrate contact portion and the substrate support portion each comprise a core portion comprising a metal, and the covering portion is provided at an end of the core portion.

9. The inverting device of claim 8, wherein the covering portion comprises a first covering portion provided on an end of the core portion and a second covering portion covering a surface of the first covering portion.

10. The inverting device of claim 9, wherein the first covering portion comprises polyolefin or elastomer.

11. The inverting device of claim 1, wherein the substrate contact portion comprises a plurality of substrate contact portions and the substrate support portion comprises a plurality of substrate support portions.

12. The inverting device of claim 11, wherein each of the plurality of substrate contact portions and each of the plurality of substrate support portions are opposed to each other.

13. The inverting device of claim 11, wherein each of the plurality of substrate contact portions and each of the plurality of substrate support portions are formed in a bar shape.

* * * * *